(12) United States Patent
Schrödinger et al.

(10) Patent No.: US 6,789,939 B2
(45) Date of Patent: Sep. 14, 2004

(54) TEMPERATURE SENSOR AND METHOD FOR OPERATING A TEMPERATURE SENSOR

(75) Inventors: Karl Schrödinger, Berlin (DE); Jaro Robert Stimma, Berlin (DE)

(73) Assignee: Infineon Technologies AG, Munich (DE)

( * ) Notice: Subject to any disclaimer, the term of this patent is extended or adjusted under 35 U.S.C. 154(b) by 4 days.

(21) Appl. No.: 10/217,912

(22) Filed: Aug. 13, 2002

(65) Prior Publication Data

US 2003/0141920 A1 Jul. 31, 2003

(30) Foreign Application Priority Data

Jan. 30, 2002 (DE) .......................................... 102 04 487

(51) Int. Cl.[7] .............................................. G01K 7/01
(52) U.S. Cl. ..................................... 374/178; 327/512
(58) Field of Search ............................... 374/171, 173, 374/178; 327/512; 330/289

(56) References Cited

U.S. PATENT DOCUMENTS

| | | | | |
|---|---|---|---|---|
| 4,165,642 A | * | 8/1979 | Lipp ........................... | 374/170 |
| 4,574,205 A | * | 3/1986 | Nagano ....................... | 327/512 |
| 4,808,847 A | * | 2/1989 | Van Kessel ................. | 327/108 |
| 5,068,595 A | * | 11/1991 | Kearney et al. ............ | 323/316 |
| 5,225,811 A | * | 7/1993 | Audy .......................... | 340/584 |
| 5,226,942 A | | 7/1993 | Letemps et al. | |
| 5,336,943 A | * | 8/1994 | Kelly et al. ................. | 327/513 |
| 5,394,078 A | * | 2/1995 | Brokaw ...................... | 323/313 |
| 5,796,290 A | | 8/1998 | Takahashi | |
| 5,961,215 A | * | 10/1999 | Lee et al. ................... | 374/178 |
| 6,084,462 A | * | 7/2000 | Barker ........................ | 327/512 |
| 6,157,244 A | * | 12/2000 | Lee et al. ................... | 327/539 |
| 6,255,892 B1 | * | 7/2001 | Gartner et al. ............. | 327/512 |
| 6,441,674 B1 | * | 8/2002 | Lin .............................. | 327/512 |
| 6,489,831 B1 | * | 12/2002 | Matranga et al. .......... | 327/512 |
| 6,674,185 B2 | * | 1/2004 | Mizuta ........................ | 307/651 |
| 2002/0014918 A1 | * | 2/2002 | Schrodinger et al. ....... | 330/289 |

FOREIGN PATENT DOCUMENTS

| | | | | |
|---|---|---|---|---|
| DE | 198 41 202 C1 | 3/2000 | | |
| EP | 0 523 799 A1 | 1/1993 | | |
| JP | 02183126 A | * 7/1990 | ............ | G01K/7/00 |

* cited by examiner

*Primary Examiner*—Diego Gutierrez
*Assistant Examiner*—Mirellys Jagan
(74) *Attorney, Agent, or Firm*—Laurence A. Greenberg; Werner H. Stemer; Gregory L. Mayback

(57) ABSTRACT

The invention relates to a temperature sensor having a first FET transistor circuit and a second FET transistor circuit and also to a method for operating a temperature sensor. Both FET transistor circuits are operated at an operating point that lies outside the temperature-independent operating point. The difference between the voltages at the first and second FET transistor circuits is evaluated as a measure of the temperature at one of the FET transistor circuits. The invention enables the temperature sensor to provide a relatively large output signal even in the case of only small changes in temperature.

22 Claims, 3 Drawing Sheets

TEMPERATURE SENSOR AND METHOD FOR OPERATING A TEMPERATURE SENSOR

BACKGROUND OF THE INVENTION

Field of the Invention

The invention relates to a temperature sensor including two FET's (Field Effect Transistors) that each have an operating point at which the gate voltage is essentially temperature independent for a constant drain-source current. The invention also relates to method for operating the temperature sensor.

U.S. Pat. No. 5,226,942 describes a temperature sensor that has two field-effect transistors. One of these transistors is operated in the region below the pinch-off voltage (subthreshold region) and the other is operated at an operating point at which, for a constant drain-source current, the gate voltage is essentially temperature-independent. By comparing the voltages at the two field-effect transistors, a signal is generated that is dependent on the temperature of the transistor that is operated below the pinch-off voltage.

A temperature sensor of this type is also disclosed in U.S. Pat. No. 5,796,290. A first field-effect transistor is operated at an operating point at which, for a constant drain-source current, the gate voltage is essentially temperature-independent. A second field-effect transistor is operated below the temperature-independent operating point and thus in a region in which, for a constant drain-source current, the gate voltage is temperature-dependent. The difference between the voltages at the first and second field-effect transistors is evaluated as a measure of the temperature.

One disadvantage of the known temperature sensors is that the change in voltage obtained because of a change in temperature is small because of the small currents and voltages in the region below the pinch-off voltage or the temperature-independent operating point. This change in voltage, therefore, can only be processed further with difficulty.

SUMMARY OF THE INVENTION

It is accordingly an object of the invention to provide a temperature sensor and a method for operating the temperature sensor which overcomes the above-mentioned disadvantages of the prior art apparatus and methods of this general type.

In particular, it is an object of the invention to provide a temperature sensor and a method for operating the temperature sensor, which for the compensation of temperature dependences in analog or digital circuits, provide an output signal that is dependent on the temperature. In this case, small changes in temperature are intended to bring about an output signal that is as large as possible.

With the foregoing and other objects in view there is provided, in accordance with the invention, a temperature sensor that includes: a first FET transistor circuit and a second FET transistor circuit that each have a gate voltage and a temperature-independent operating point at which, for a constant drain-source current, the gate voltage is essentially temperature-independent. There is also a circuit for operating the first FET transistor circuit at a first operating point that is different from the temperature-independent operating point. The circuit is also provided for operating the second FET transistor circuit at a second operating point that is different from the temperature-independent operating point. The first FET transistor circuit provides a first voltage, and the second FET transistor circuit provides a first voltage. A difference between the first voltage and the second voltage is evaluated as a measure of a temperature of the first FET transistor circuit or the second FET transistor circuit.

With the foregoing and other objects in view there is provided, in accordance with the invention, a method for operating a temperature sensor. The method includes steps of: providing the temperature sensor with a first FET transistor circuit, a second FET transistor circuit, and a circuit for operating the first FET transistor circuit and the second FET transistor circuit; evaluating a difference between a voltage at the first FET transistor circuit and a voltage at the second FET transistor circuit as a measure of a temperature at the first FET transistor circuit or the second FET transistor circuit; providing the first FET transistor circuit and the second FET transistor circuit with a temperature-independent operating point at which, for a constant drain-source current, a gate voltage is essentially temperature-independent; and operating the first FET transistor circuit and the second FET transistor circuit at a respective operating point that is different from the temperature-independent operating point.

Accordingly, the temperature sensor is distinguished by circuitry for operating the first FET transistor circuit at an operating point that lies above or below the temperature-independent operating point. The circuitry is also for operating the second FET transistor circuit at an operating point that likewise lies above or below the temperature-independent operating point. The difference between the voltages at the first and second FET transistor circuits is evaluated as a measure of the temperature at one of the FET transistor circuits.

Consequently, unlike in the case of the temperature sensors known in the prior art, in the invention the operating points of both FET transistor circuits are put outside of the temperature-independent operating point of the respective transistor. In particular, the operating point of one FET transistor circuit may be put above and the operating point of the other FET transistor circuit may be put below the temperature-independent operating point. This increases the temperature response since the two temperature responses of the two FET transistor circuits are added together. Accordingly, the temperature sensor provides a relatively large output signal even in the case of small changes in temperature.

A further advantage of the inventive solution is that the tolerance of the circuit required for setting the current is increased since the temperature-independent operating point no longer has to be found exactly in one of the FET transistor circuits.

It is pointed out that each field-effect transistor has an operating point at which, for a constant drain-source current, the gate voltage is essentially temperature-independent (zero temperature coefficient point). The drain-source current has a positive temperature coefficient below this operating point, and a negative temperature coefficient above this operating point. This is described in detail in the literature.

In one refinement of the invention, the operating point of both FET transistor circuits lies above or below the temperature-independent operating point. A relatively large tolerance of the current feed-in may be present in this variant, too.

The circuitry for operating the first FET transistor circuit and for operating the second FET transistor circuit preferably have a current generator that feeds the two transistor circuits with constant currents. In this case, the current generator advantageously increases two coupled current sources that feed the FET transistor circuits. By using a current generator that operates the two FET transistor circuits with different currents, the desired operating points of the transistor circuits can be set simply and reliably. For setting the operating points, the current generator in this case contains, for example, a current mirror that defines the operating points of the FET transistor circuits.

As an alternative, the circuit for operating the first and second FET transistor circuits in each case have a resistor connected in series with the respective FET transistor circuit. In this embodiment of variant, the FET transistor circuits are fed by the resistors.

In a development of the temperature sensor, an amplifier circuit detects the difference between the voltages at the first and second FET transistor circuits and converts the difference voltage into a control voltage, for example, for an amplifier circuit connected downstream. The amplifier circuit amplifies the difference voltage and matches it to the operating point.

The FET transistor circuits preferably in each case have at least one MOS transistor that is operated as a diode circuit, i.e. the gate is connected to the drain terminal.

In order to enable more variable generation of the difference voltage between the two FET transistor circuits, in a further refinement of the invention, cascaded MOS transistors are used for the first and/or the second FET transistor circuit, i.e. FET transistors are connected in series. In this case, the difference voltage can be set over a very wide voltage range in a simple manner by varying the supply currents and the transistor parameters.

Other features which are considered as characteristic for the invention are set forth in the appended claims.

Although the invention is illustrated and described herein as embodied in a Temperature sensor and method for operating a temperature sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2b shows the circuit of a MOS transistor when plotting the transistor characteristic curve in accordance with FIG. 2a.

DESCRIPTION OF THE PREFERRED EMBODIMENTS

Figure 1:
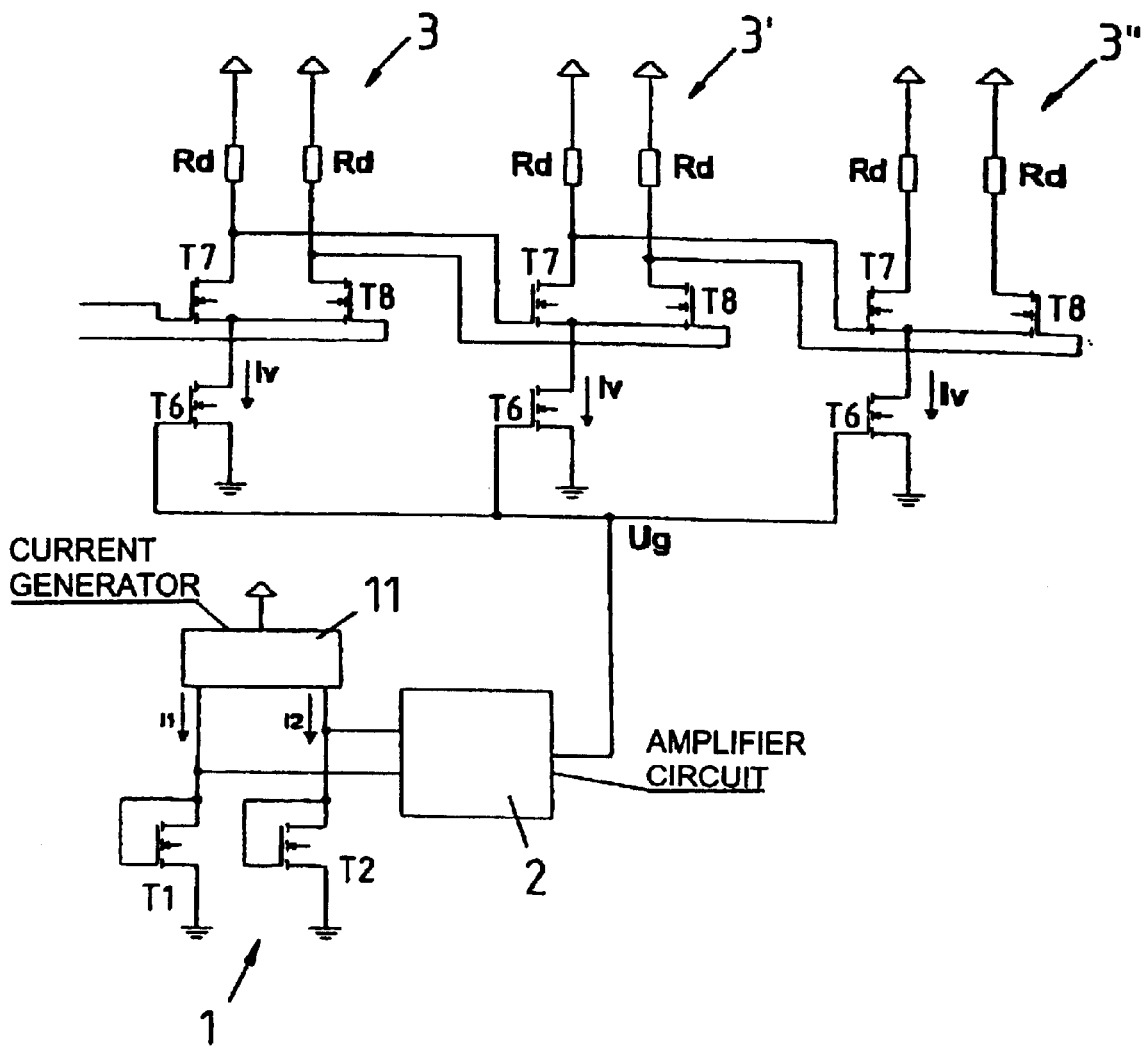
FIG. 1 shows the basic components of a temperature sensor that provides an output signal for controlling an amplifier circuit, for example.

Referring now to the figures of the drawing in detail and first, particularly, to FIG. 1 thereof, there is shown a temperature sensor 1 that is realized by two MOS transistors T1 and T2 that are each arranged as a diode, i.e. the gate terminal and the drain terminal of the transistors are connected to one another. The transistors T1 and T2 are operated with different currents I1 and I2 by using a current generator 11 with two coupled current sources. In this case, the current generator 11 is connected to the gate terminal of each transistor T1, T2. The source terminal of each transistor T1, T2 is grounded.

The amplifier circuit 2 has two inputs. One input of the amplifier circuit 2 is connected to the drain terminal of the transistor T1 and the other input is connected to the drain terminal of the transistor T2. The control circuit 2 thus detects the difference between the voltages at the two transistors T1 and T2 and converts this difference voltage into a control voltage Ug.

In the exemplary embodiment shown in FIG. 1, the control voltage Ug is supplied to a plurality of transistors T6, which form current sources for differential amplifier stages 3, 3', 3". The amplifier stages 3, 3', 3", each increase MOS transistors T7, T8 and drain resistors Rd. The current through the individual amplifier stages 3, 3', 3" is in each case set by the gate voltage at the transistor T6. In this case, the gate voltage can be set such that the current Iv through the amplifier stages is reduced as the temperature decreases.

However, the control voltage Ug is not restricted to being used to control an amplifier circuit connected downstream. In principle, the control voltage can be used for the compensation of temperature dependences in any desired analog or digital circuit.

Figure 2B:
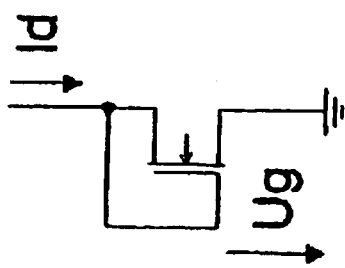
Figure 2A:
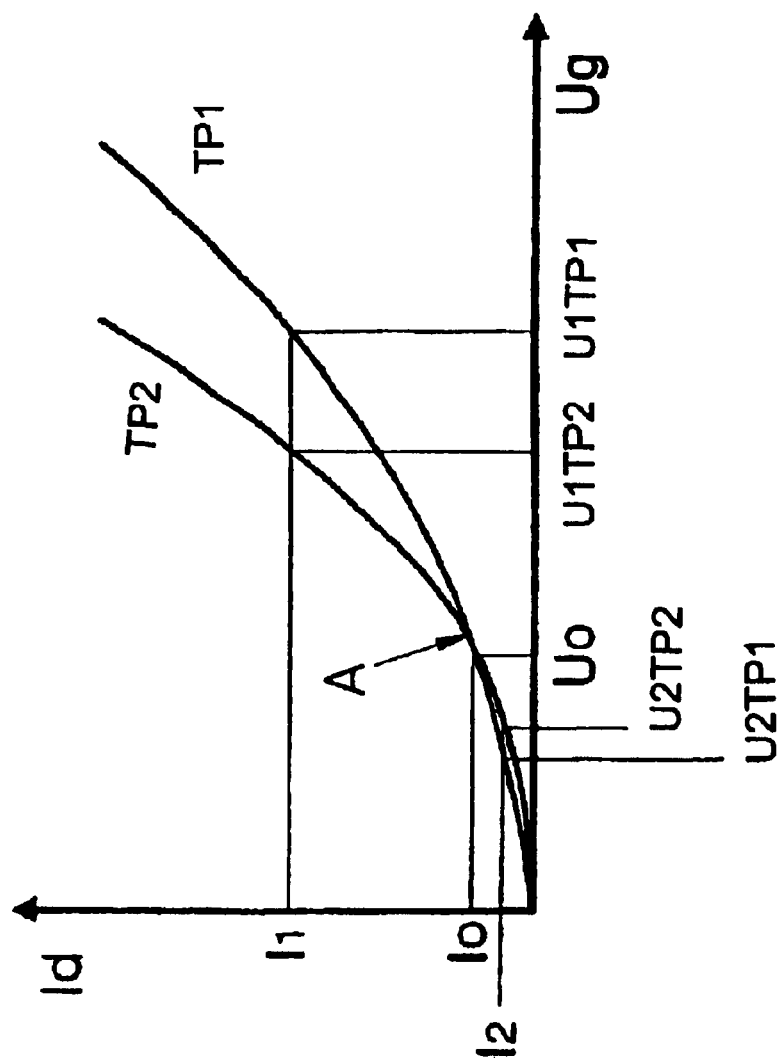
FIG. 2a diagrammatically shows the transistor characteristic curve of a MOS transistor for two temperatures.

Depending on the current density, a different temperature dependence of the gate voltage results, which is utilized for the temperature measurement. FIG. 2a diagrammatically shows the transistor characteristic curve of a MOS transistor (for instance transistor T1 or the transistor T2 shown in FIG. 1) for two temperatures TP1 and TP2, where TP2 is less than TP1. The associated circuit for which the transistor characteristic curve is plotted is illustrated in FIG. 2b. The transistor is operated in a diode circuit during the plotting of the transistor characteristic curve.

In accordance with FIG. 2a, there exists an operating point A at which the temperature coefficient is equal to zero, i.e. for a constant drain-source current Id the gate voltage Ug is temperature-independent (Id=I0 and Ug=U0). The temperature coefficient of the drain-source current Id is positive below this point A and negative above the point A.

In the case of the circuit shown in FIG. 1, the transistor T2 is now operated at a current intensity I2 that lies below the temperature-independent operating point A. In this region, the temperature coefficient of Id is positive, i.e. as the temperature increases, a smaller voltage is required for realizing a predetermined current intensity I2. Thus, in FIG. 2a, for realizing the current intensity I2, the voltage U2TP2 is required at the lower temperature TP2 and the lower voltage U2TP1 is required at the higher temperature TP1.

By contrast, the transistor T1 is operated at an operating point above the temperature-independent operating point A. In this region, the temperature coefficient of Id is negative i.e. as the temperature increases, a higher voltage is required for realizing a predetermined current intensity I2. Thus, in FIG. 2a, for realizing the current intensity I1, the voltage U1TP2 is required at the lower temperature TP2 and the higher voltage U1TP1 is required at the higher temperature TP1.

Since the transistor T2 is operated at the operating point I2 and the transistor T1 is operated at the operating point I1, the voltage varies at both operating points I1 in dependence on the temperature, to be precise with temperature coefficients of different signs. This means that the two temperature responses of the transistors T1, T2 are added together. Consequently, a small change in temperature (from TP2 to TP1) already leads to a relatively large change in the voltage difference at the two transistors T1, T2 (from U1TP2–U2TP2 to U1TP1–U2TP1). In this case, the difference voltage (U1–U2) increases as the temperature TP increases.

It can be discerned, in particular, that the difference voltage U1Tx–U2Tx is greater than for the case where a transistor is operated at the temperature-independent operating point A.

The difference voltage (U1–U2) is converted into the control voltage Ug by the amplifier circuit 2. The amplifier circuit 2 matches the operating point in addition to performing amplification. In the exemplary embodiment shown in FIG. 1, the control voltage Ug sets the gate voltage of the transistors T6 in accordance with the desired current Iv.

When the temperature decreases, the voltage U1 at the transistor T1 falls and the voltage U2 of the transistor T1 of the temperature sensor 1 rises. Accordingly, the difference voltage (U1–U2) also falls. As a result, the control voltage Ug, which represents the gate voltage of the transistors Q1, is also reduced. At decreasing temperatures, this leads to a reduced current Iv through the amplifier stages. Consequently, the circuit illustrated ensures that, at low temperatures, only a reduced current flows through the amplifier stages. This leads to a reduced gain which compensates for an increase in the gain that is usually effected at low temperatures.

Figure 3:
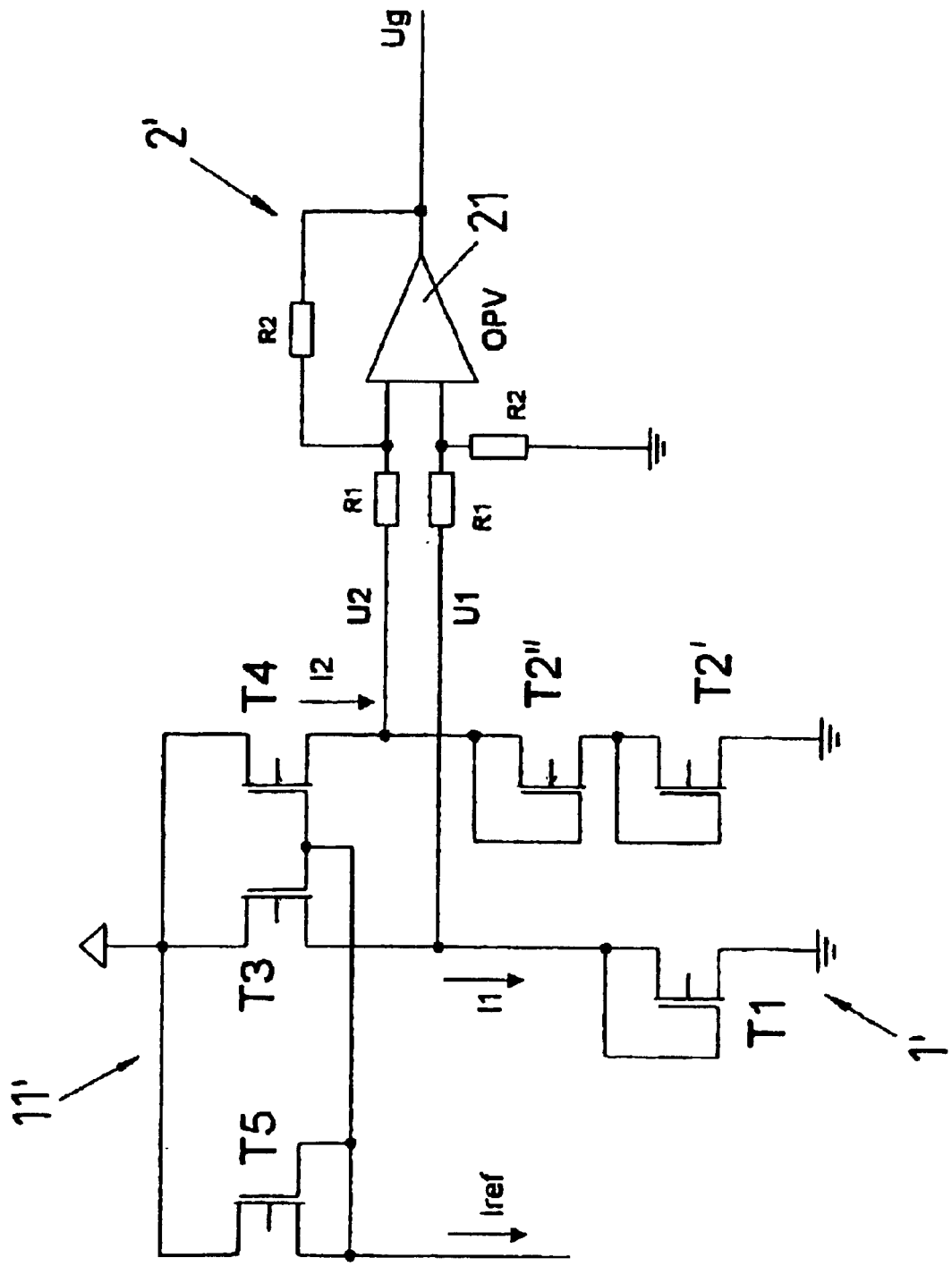
FIG. 3 shows a circuit diagram of an exemplary embodiment of the temperature sensor.

FIG. 3 shows a detailed illustration of an exemplary embodiment of a temperature sensor 1'. A current source 11' is formed by three field-effect transistors T3, T4, T5, which constitute a current mirror. The reference current Iref impressed on the transistor T5 determines the gate voltage at the transistors T3, T4. The currents I1, I2, through the transistors T3, T4, are set by the reference current Iref and the dimensions of the transistors T3, T4, T5.

The currents I1, I2 through the transistors T3, T4 define the operating points of the further field-effect transistors T1, T2', T2". The field-effect transistors T1, T2', T2" serve for the actual temperature measurement. In contrast to FIG. 1, the transistor T2 is in this case replaced by two series-connected transistors T2', T2". As an alternative, it is also possible for more than two transistors to be connected in series.

The amplifier circuit 2' further processes the temperature-dependent voltage U1–U2, i.e. the difference between the voltages at the transistor T1 and the transistors T2' and T2". The amplifier circuit 2' is formed by a subtraction circuit—known per se—for the two input voltages U2 and U1. The subtraction circuit has an inverting operational amplifier 21, to which the input voltage U1 is fed to the noninverting input via a voltage divider. Since the ratio of the resistors R1, R2 at the inverting input and at the noninverting input is identical, only the difference between the input voltages (U1–U2) is amplified and output as the control voltage Ug.

In this case, the input currents into the amplifier (through R1) are intended to be negligible such that the operating point currents I1, I2 are not corrupted.

Through varying the currents I1 and I2 and the parameters of the transistors T1, T2', T2", the difference voltage (U1–U2) can be set virtually arbitrarily in the circuit shown in FIG. 3. As a result, this temperature-dependent voltage can be converted to the required voltage Ug by using the operational amplifier 21.

We claim:

1. A temperature sensor, comprising:
   a first FET transistor circuit and a second FET transistor circuit each having a gate voltage and a temperature-independent operating point at which, for a constant drain-source current, the gate voltage is essentially temperature-independent;
   a circuit for operating said first FET transistor circuit at a first operating point being different from said temperature-independent operating point, said circuit also being for operating said second FET transistor circuit at a second operating point being different from said temperature-independent operating point;
   said first FET transistor circuit providing a first voltage;
   said second FET transistor circuit providing a second voltage; and
   a difference between the first voltage and the second voltage being evaluated as a measure of a temperature at a transistor circuit selected from a group consisting of said first FET transistor circuit and said second FET transistor circuit.

2. The temperature sensor according to claim 1, wherein:
   said first operating point is above said temperature-independent operating point; and
   said second operating point is below said temperature-independent operating point.

3. The temperature sensor according to claim 1, wherein:
   said first operating point is above said temperature-independent operating point; and
   said second operating point is above said temperature-independent operating point.

4. The temperature sensor according to claim 1, wherein:
   said first operating point is below said temperature-independent operating point; and
   said second operating point is below said temperature-independent operating point.

5. The temperature sensor according to claim 1, wherein:
   said circuit includes a resistor connected in series with said first FET transistor circuit; and
   said circuit includes a resistor connected in series with said second FET transistor circuit.

6. The temperature sensor according to claim 1, wherein:
   said first FET transistor circuit includes a FET transistor that is connected to form a diode; and
   said second FET transistor circuit includes a FET transistor that is connected to form a diode.

7. The temperature sensor according to claim 1, wherein:
   a transistor circuit selected from a group consisting of said first FET transistor circuit and said second FET transistor circuit includes a plurality of FET transistors connected in series.

8. The temperature sensor according to claim 1, wherein:
   said first operating point is below said temperature-independent operating point; and
   said second operating point is above said temperature-independent operating point.

9. The temperature sensor according to claim 1, comprising:
   an amplifier circuit for detecting the difference between the first voltage and the second voltage and for converting the difference into a control voltage.

10. The temperature sensor according to claim 9, comprising:

a further amplifier circuit receiving the control voltage.

11. The temperature sensor according to claim 1, wherein:
said circuit includes a current generator that feeds constant currents to said first FET transistor circuit and to said second FET transistor circuit.

12. The temperature sensor according to claim 11, wherein:
said current generator includes a current mirror that defines the first operating point and the second operating point.

13. The temperature sensor according to claim 11, wherein:
said current generator includes two coupled current sources that feed said first FET transistor circuit and said second FET transistor circuit.

14. The temperature sensor according to claim 13, wherein:
said current generator includes a current mirror that defines the first operating point and the second operating point.

15. A temperature sensor, comprising:
a first FET transistor circuit and a second FET transistor circuit each having a gate voltage and a temperature-independent operating point at which, for a constant drain-source current, the gate voltage is essentially temperature-independent;
a circuit for operating said first FET transistor circuit at a first operating point being different from said temperature-independent operating point, said circuit also being for operating said second FET transistor circuit at a second operating point being different from said temperature-independent operating point;
said first FET transistor circuit providing a first voltage;
said second FET transistor circuit providing a second voltage;
a difference between the first voltage and the second voltage being evaluated as a measure of a temperature at a transistor circuit selected from a group consisting of said first FET transistor circuit and said second FET transistor circuit; and
an amplifier circuit detecting a difference in said gate voltages at said first and said second FET transistor circuits, and for converting the difference into a control voltage for controlling the current source of a further amplifier circuit.

16. The temperature sensor according to claim 15, wherein said control voltage forms a gate voltage of a FET transistor, said gate voltage of said FET transistor is a current source for a differential amplifier.

17. A method for operating a temperature sensor, which comprises:
providing the temperature sensor with a first FET transistor circuit, a second FET transistor circuit, and a circuit for operating the first FET transistor circuit and the second FET transistor circuit;
evaluating a difference between a voltage at the first FET transistor circuit and a voltage at the second FET transistor circuit as a measure of a temperature at a transistor circuit selected from a group consisting of the first FET transistor circuit and the second FET transistor circuit;

providing the first FET transistor circuit and the second FET transistor circuit with a temperature-independent operating point at which, for a constant drain-source current, a gate voltage is essentially temperature-independent; and
operating the first FET transistor circuit and the second FET transistor circuit at a respective operating point that is different from the temperature-independent operating point.

18. The method according to claim 17, which comprises:
operating the first FET transistor circuit above the temperature-independent operating point; and
operating the second FET transistor circuit below the temperature-independent operating point.

19. The method according to claim 17, which comprises:
operating the second FET transistor circuit above the temperature-independent operating point; and
operating the first FET transistor circuit below the temperature-independent operating point.

20. The method according to claim 17, which comprises:
operating the first FET transistor circuit above the temperature-independent operating point; and
operating the second FET transistor circuit above the temperature-independent operating point.

21. The method according to claim 17, which comprises:
operating the first FET transistor circuit below the temperature-independent operating point; and
operating the second FET transistor circuit below the temperature-independent operating point.

22. A method for operating a temperature sensor, which comprises:
providing the temperature sensor with a first FET transistor circuit, a second FET transistor circuit, and a circuit for operating the first FET transistor circuit and the second FET transistor circuit;
evaluating a difference between a voltage at the first FET transistor circuit and a voltage at the second FET transistor circuit as a measure of a temperature at a transistor circuit selected from a group consisting of the first FET transistor circuit and the second FET transistor circuit;
providing the first FET transistor circuit and the second FET transistor circuit with a temperature-independent operating point at which, for a constant drain-source current, a gate voltage is essentially temperature-independent; and
operating the first FET transistor circuit and the second FET transistor circuit at a respective operating point that is different from the temperature-independent operating point;
detecting the difference between the first voltage and the second voltage and converting the difference into a control voltage using an amplifier circuit; and
controlling a further amplifier circuit using the control voltage.

* * * * *